(12) United States Patent
Koyama et al.

(10) Patent No.: US 8,318,277 B2
(45) Date of Patent: Nov. 27, 2012

(54) PLASTIC FUEL TANK

(75) Inventors: Kazutake Koyama, Wako (JP); Masahiro Yonemura, Wako (JP); Yutaka Tabata, Wako (JP); Teruyuki Saitoh, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 161 days.

(21) Appl. No.: 12/959,414

(22) Filed: Dec. 3, 2010

(65) Prior Publication Data

US 2011/0155727 A1   Jun. 30, 2011

(30) Foreign Application Priority Data

Dec. 24, 2009   (JP) ................................ 2009-291883

(51) Int. Cl.
*B29D 22/00* (2006.01)
(52) U.S. Cl. ...................... 428/35.7; 428/36.7
(58) Field of Classification Search ............... 428/35.7, 428/36.7
See application file for complete search history.

(56) References Cited

U.S. PATENT DOCUMENTS

| | | | |
|---|---|---|---|
| 4,370,809 A | 2/1983 | Takahashi et al. | |
| 5,608,165 A | 3/1997 | Mozurkewich, Jr. | |
| 5,618,599 A * | 4/1997 | Nulman et al. | 428/36.7 |
| 5,866,819 A * | 2/1999 | Albu et al. | 73/629 |
| 5,871,097 A | 2/1999 | Shida et al. | |
| 6,033,749 A * | 3/2000 | Hata et al. | 428/36.7 |
| 6,289,915 B1 * | 9/2001 | Nulman et al. | 137/43 |
| 7,600,652 B1 * | 10/2009 | Johansen | 220/586 |

FOREIGN PATENT DOCUMENTS

| | | |
|---|---|---|
| CN | 1172757 A | 2/1998 |
| DE | 10139782 A1 | 5/2002 |
| DE | 10214900 A1 | 4/2004 |
| EP | 1955887 A2 | 8/2008 |
| EP | 2018961 A1 | 1/2009 |
| JP | 51-013016 Y1 | 1/1976 |
| JP | 58-112954 A | 7/1983 |
| JP | 03-293125 A | 12/1991 |
| JP | 2001-097053 A | 4/2001 |
| JP | 2004-052659 A | 2/2004 |
| JP | 2004052659 * | 2/2004 |
| JP | 2004-203199 A | 7/2004 |
| JP | 2004-529003 A | 9/2004 |
| JP | 2009-132297 A | 6/2009 |
| WO | 02/064366 A1 | 8/2002 |
| WO | 2007-146216 A1 | 12/2007 |

OTHER PUBLICATIONS

Japanese Office Action dated Nov. 1, 2011, issued in corresponding Japanese Patent Application No. 2009-291883.(w/partial English translation).

(Continued)

*Primary Examiner* — N. Edwards
(74) *Attorney, Agent, or Firm* — Westerman, Hattori, Daniels & Adrian, LLP

(57) ABSTRACT

A plastic fuel tank is disclosed including polyethylene layers laminated respectively onto an upper surface and a lower surface of an ethylene/vinyl alcohol layer for preventing fuel seepage. The outermost polyethylene layer laminated onto the upper surface is a high-density polyethylene layer colored black so as to minimize transmission of ultraviolet light.

6 Claims, 5 Drawing Sheets

OTHER PUBLICATIONS

European Search Report dated Apr. 29, 2011, issued in corresponding European Patent Application No. 10252227.3.
Extended European Search Report dated May 6, 2011, issued in European Patent Application No. 10252228.1.
Chinese Office Action dated May 29, 2012, issued in Chinese Patent Application No. 201010582889.0. (3 pages).
Swiler, D. R. 2005. Pigments, Inorganic. Kirk-Othmer Encyclopedia of Chemical Technology (Aug. 2005).

* cited by examiner

PLASTIC FUEL TANK

FIELD OF THE INVENTION

The present invention relates to a plastic or resinous fuel tank wherein a polyethylene layer is laminated via an adhesive plastic layer onto both sides of an ethylene/vinyl alcohol layer for preventing fuel seepage or permeation.

BACKGROUND OF THE INVENTION

In recent years, plastic fuel tanks have also come to be used in general-purpose engines and the like, and known plastic fuel tanks offering a possible solution with respect to environmental pollution are disclosed, for example, in JP-A 2004-52659.

FIG. 5 hereof shows the plastic fuel tank disclosed in JP-A 2004-52659.

Referring to FIG. 5, a coupling member 102 is mounted on a tank assembly 101 in a plastic fuel tank 100. The tank assembly 101 includes a barrier layer 103 constructed from an ethylene/vinyl alcohol copolymer for preventing fuel seepage; an innermost layer 104 laminated onto an interior side of the barrier layer 103, and constructed from polyethylene; and an outermost layer 105 laminated onto an exterior side of the barrier layer 103 and constructed from polyethylene. The fuel would seep to the exterior from inside the tank assembly 101, but is blocked by the barrier layer 103.

It is known that the ethylene/vinyl alcohol copolymer will degrade when exposed to ultraviolet light for a long period of time. For example, there have been instances in which the plastic fuel tank 100 used in general-purpose engines has been bleached by long exposure to ultraviolet light, and the barrier layer 103 constructed from the ethylene/vinyl alcohol copolymer is degraded by ultraviolet light. Specifically, a need exists for a plastic fuel tank that will prevent fuel seepage and be weather resistant with regard to ultraviolet light or the like.

SUMMARY OF THE INVENTION

It is therefore an object of the present invention to provide a plastic fuel tank that prevents fuel seepage and is weather resistant.

According to one aspect of the present invention, there is provided a plastic fuel tank including a tank assembly and a filler neck, comprising: an ethylene/vinyl alcohol layer for preventing fuel seepage; an outermost polyethylene layer laminated onto one surface of the ethylene/vinyl alcohol layer; an innermost polyethylene layer laminated onto another surface of the ethylene/vinyl alcohol layer; and the outermost polyethylene layer being a high-density polyethylene layer colored so as to minimize transmission of ultraviolet light.

The outermost polyethylene layer minimizes the transmission of ultraviolet light, enabling degradation of the ethylene/vinyl alcohol layer or the like to be prevented, and weather resistance to be improved. As a result, it is possible to provide a plastic fuel tank that prevents fuel seepage and is weather resistant.

In addition, since the transmission of ultraviolet light into the plastic fuel tank is minimized, it is possible to prevent the fuel from degrading. In particular, the fuel is colored differently by the transmission of ultraviolet light, depending on the type of gasoline used as the fuel, but the present invention can prevent color change in the fuel and can improve the appearance of the plastic fuel tank on the inside.

Preferably, the innermost polyethylene layer is white or colorless. Light penetrates through the filler neck when the filler cap is removed to look inside the plastic fuel tank through the filler neck, but the white or colorless interior surface reflects the light, illuminating the interior of the tank and hence allowing the fluid level to be determined.

Desirably, the high-density polyethylene layer is black. The transmission of ultraviolet light is therefore minimized, allowing the weather resistance of the plastic fuel tank to be improved.

In a preferred form, the high-density polyethylene layer is colored by admixing carbon black powder. Production can therefore be facilitated merely by admixing carbon black powder into the high-density polyethylene layer.

Preferably, a colorless, recycled polyethylene layer is interposed between the ethylene/vinyl alcohol layer and the outermost polyethylene layer. Recycled polyethylene material is inexpensive, allowing the costs associated with the plastic fuel tank to be reduced.

Desirably, the tank assembly is formed integrally with the filler neck. Thus, there is no joint between the tank assembly and the filler neck, eliminating concern that fuel will leak through the joint. In addition, there is no need to produce the components of the filler neck separately, allowing the costs associated with the entire plastic fuel tank to be reduced.

It is preferred that the tank assembly be provided to an upper part of a general-purpose engine. With the tank assembly being located in the upper part of the general-purpose assembly, the plastic fuel tank is viewed from above when the general-purpose engine is placed on the ground. According to the present invention, the filler cap in the upper part of the plastic fuel tank is removed and the level of the fuel inside the tank is determined through the filler neck. The remaining fuel can therefore be readily determined even when the tank assembly is located in the upper part of the general-purpose engine.

BRIEF DESCRIPTION OF THE DRAWINGS

A preferred embodiment of the present invention will be described in detail hereinafter with reference to the accompanying drawings, in which.

DETAILED DESCRIPTION OF THE PREFERRED EMBODIMENT

Figure 1:
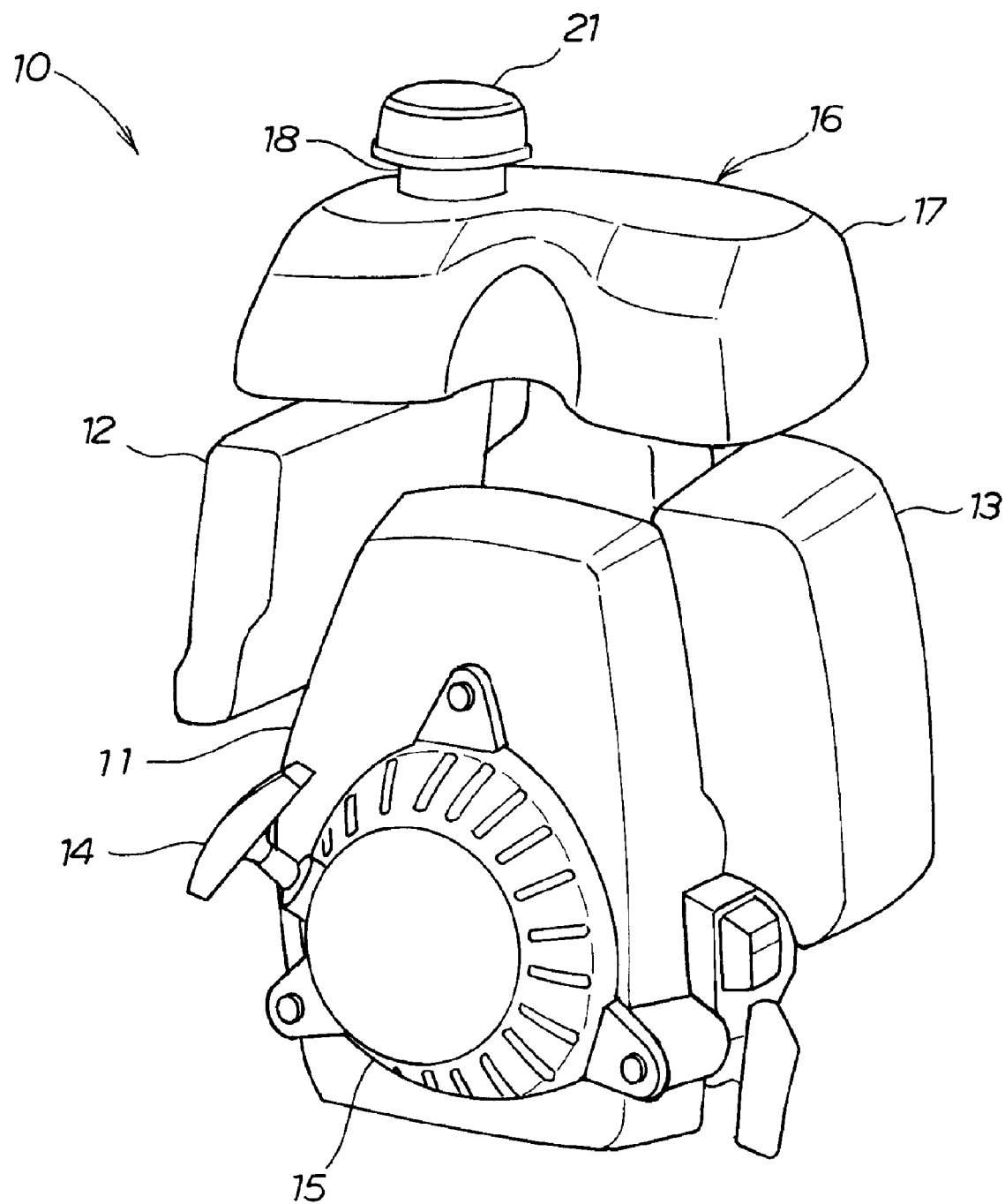
FIG. 1 is a perspective view illustrating a general-purpose engine employing a plastic fuel tank according to the present invention.

As shown in FIG. 1, a general-purpose engine 10 includes an engine assembly 11, a suction part 12 provided to a side part of the engine assembly 11 and used to draw outside air into the engine assembly 11, an exhaust part 13 provided to a side part of the engine assembly 11 and used to discharge exhaust from the engine assembly 11 to the exterior, a recoil starter 14 provided to a lower part of the engine assembly 11 and used to start up the engine assembly 11, and a recoil starter cover 15 for covering the recoil starter 14.

The general-purpose engine 10 is also provided with a plastic fuel tank 16 for storing fuel in the upper part of the engine assembly 11. The plastic fuel tank 16 includes a tank assembly 17 for storing fuel, a filler neck 18 molded integrally with the tank assembly 17 and used to introduce fuel, and a filler cap 21 mounted on the filler neck 18 and used to block the filler neck 18.

Figure 2:
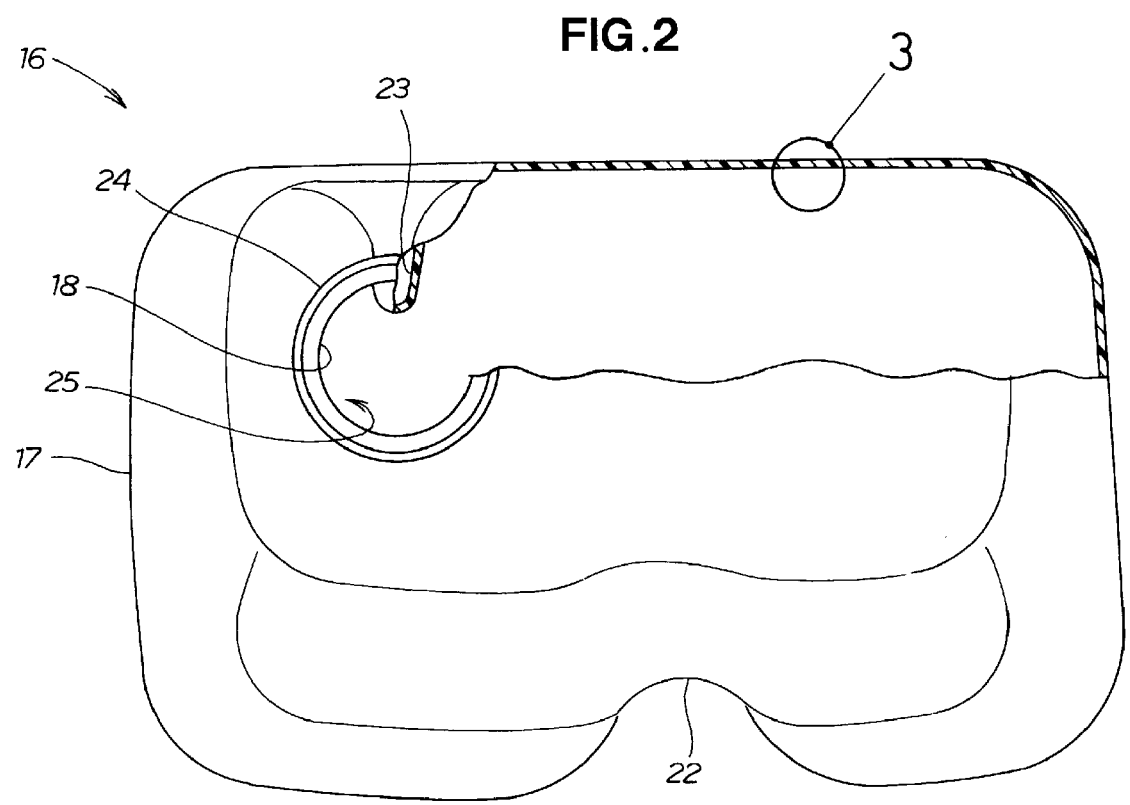
FIG. 2 is a top plan view illustrating, partly in section, the fuel tank of FIG. 1.

As shown in FIG. 2, the tank assembly 17 of the plastic fuel tank 16 has a large depression 22 sunk deep in the central forward direction, and a small depression 23 designed to engage with a part of the filler neck 18. The small depression 23 is formed so as to be visible when looking inside the plastic fuel tank 16 through the filler neck 18.

The large depression 22 and the small depression 23 also contribute to reinforcing the plastic tank 16 so as to make the tank difficult to crush.

A threaded part 24 is provided to the filler neck 18, and the filler cap 21 (FIG. 1) is fastened to the threaded part 24. The section from the tank assembly 17 of the plastic fuel tank 16 to an opening 25 of the filler neck 18 is molded as an integrated unit.

The filler neck 18 is provided to the upper part of the plastic fuel tank 16, and the opening 25 is formed so as to be facing upward when the general-purpose engine 10 (FIG. 1) is placed on the ground.

The plastic fuel tank 16 of the present invention is produced by laminating together a plurality of layers. The laminated structure will be described next.

Figure 3:
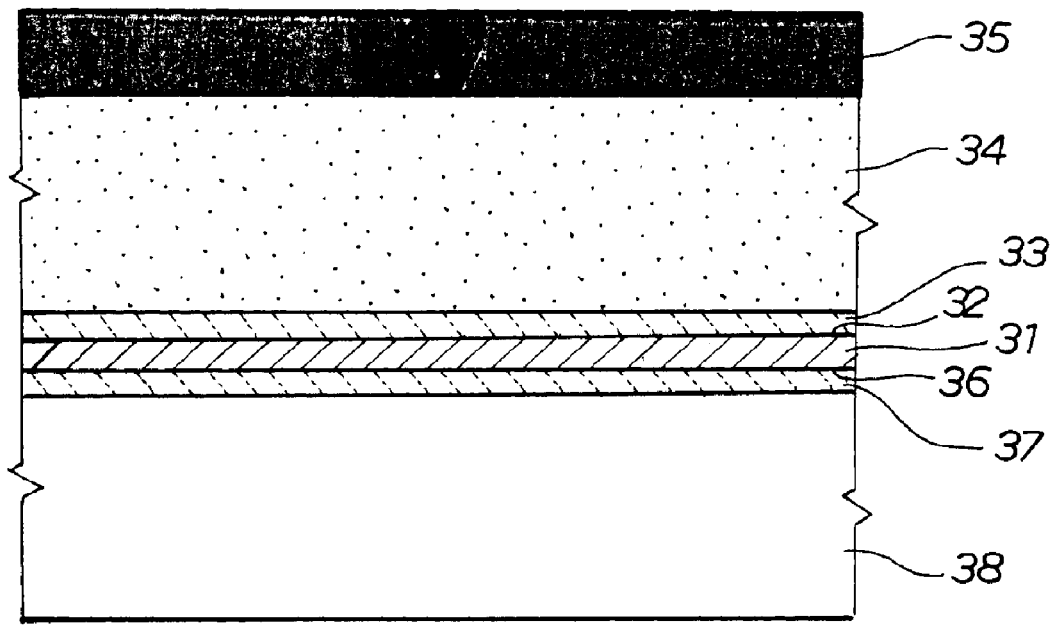
FIG. 3 is an enlarged cross-sectional view showing region 3 of FIG. 2.

As shown in FIG. 3, the plastic fuel tank 16 includes an ethylene/vinyl alcohol layer 31 for preventing the fuel from seeping, an upper adhesive plastic layer 33 laminated onto an upper surface 32 of the ethylene/vinyl alcohol layer 31, a polyethylene layer 34 laminated onto the upper adhesive plastic layer 33 and formed of a colorless, recycled polyethylene material, a polyethylene layer 35 laminated onto the polyethylene layer 34 and used as the outermost layer, a lower adhesive plastic layer 37 laminated onto a lower surface 36 of the ethylene/vinyl alcohol layer 31, and a polyethylene layer 38 laminated onto the lower adhesive plastic layer 37 and used as the innermost layer.

The outermost polyethylene layer 35 is a high-density polyethylene layer 35 colored black so as to minimize the transmission of ultraviolet light. The innermost polyethylene layer 38 is white or colorless so as to reflect any light that has entered the plastic fuel tank 16.

The innermost polyethylene layer 38 may be any pale color having a high reflectance ratio, in addition to white or colorless.

The black, high-density polyethylene layer 35 is colored by being mixed with carbon black powder.

An operation of the above-described plastic fuel tank 16 will be described next.

Figure 4A:
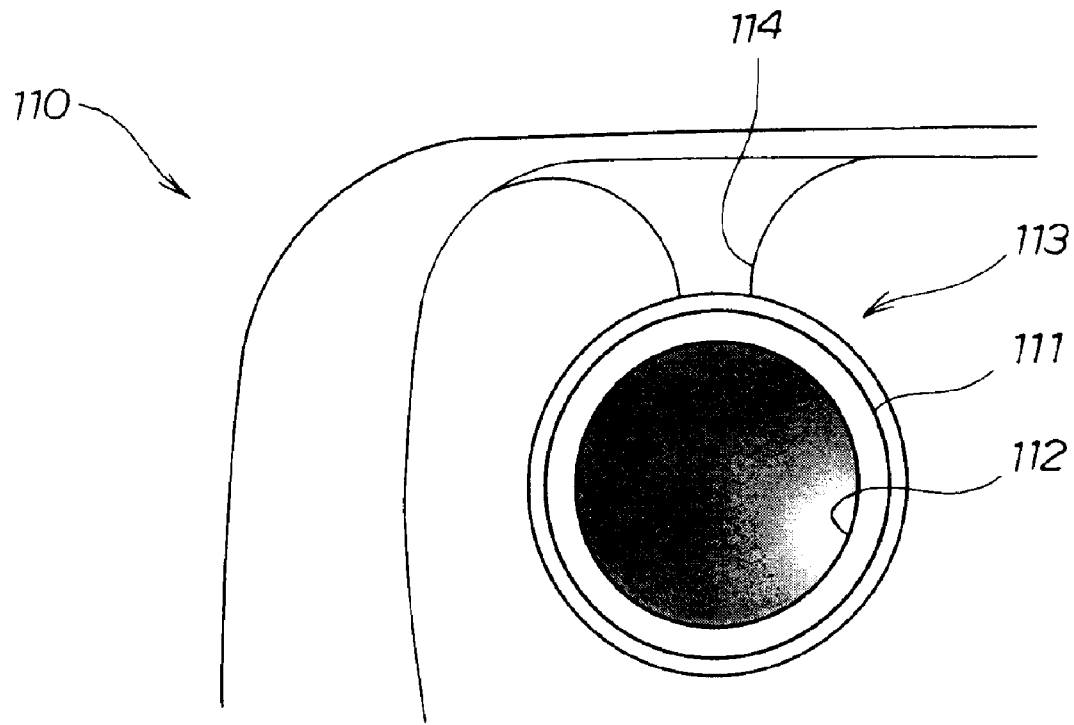
FIG. 4A is a view showing an example of a fuel tank in which both the outermost layer and the innermost layer are colored black.

FIG. 4A shows an example wherein an outermost layer (exterior side) 111 and an innermost layer (interior side) 112 of a plastic fuel tank 110 are both colored black.

When looking through a filler neck 113 into the interior of the plastic fuel tank 110, a small depression 114 cannot be seen, and the level of fuel is difficult to determine, because the interior is dark.

Commercial gasoline is colored a pale reddish-brown.

If the innermost layer 112 of the plastic fuel tank 110 is black, the reddish-brown color is superposed on a black base and therefore blends into the black color and is somewhat poorly visible.

In addition, outside light that enters through the filler neck 113 penetrates the reddish-brown gasoline and reaches the bottom, but is absorbed into the black color. It cannot be expected that the light will be reflected. Therefore, the gasoline is not very visible.

Figure 4B:
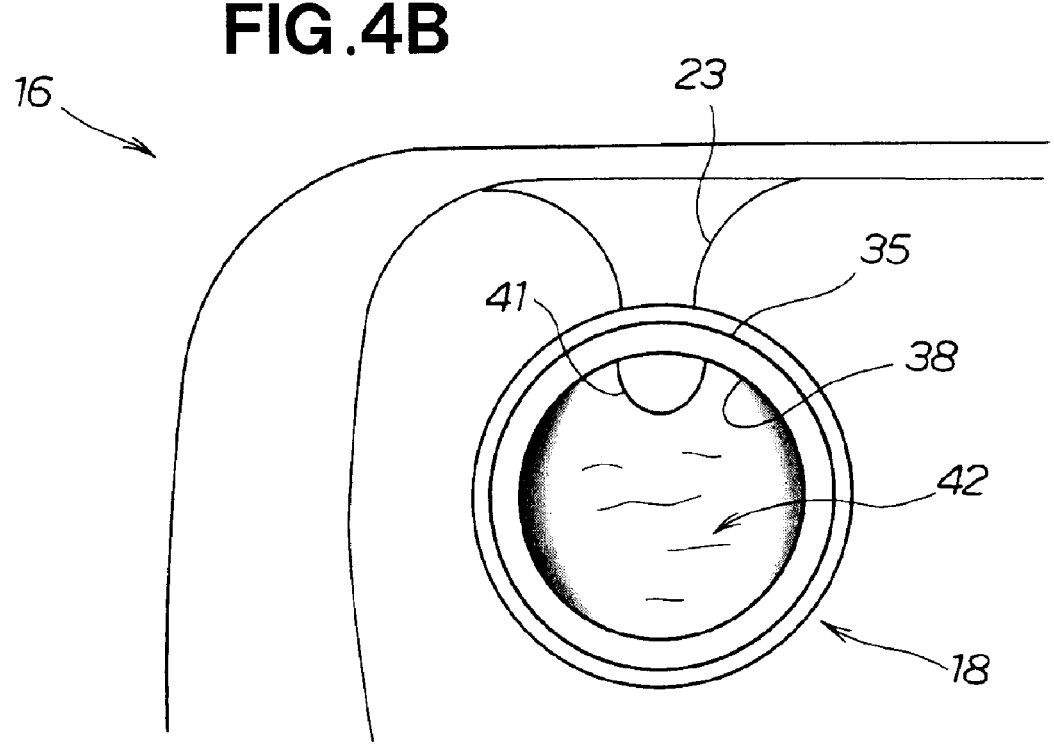
FIG. 4B is a view showing part of the fuel tank according to the present embodiment, in which the outermost layer is black while the innermost layer is colorless.
Figure 5:
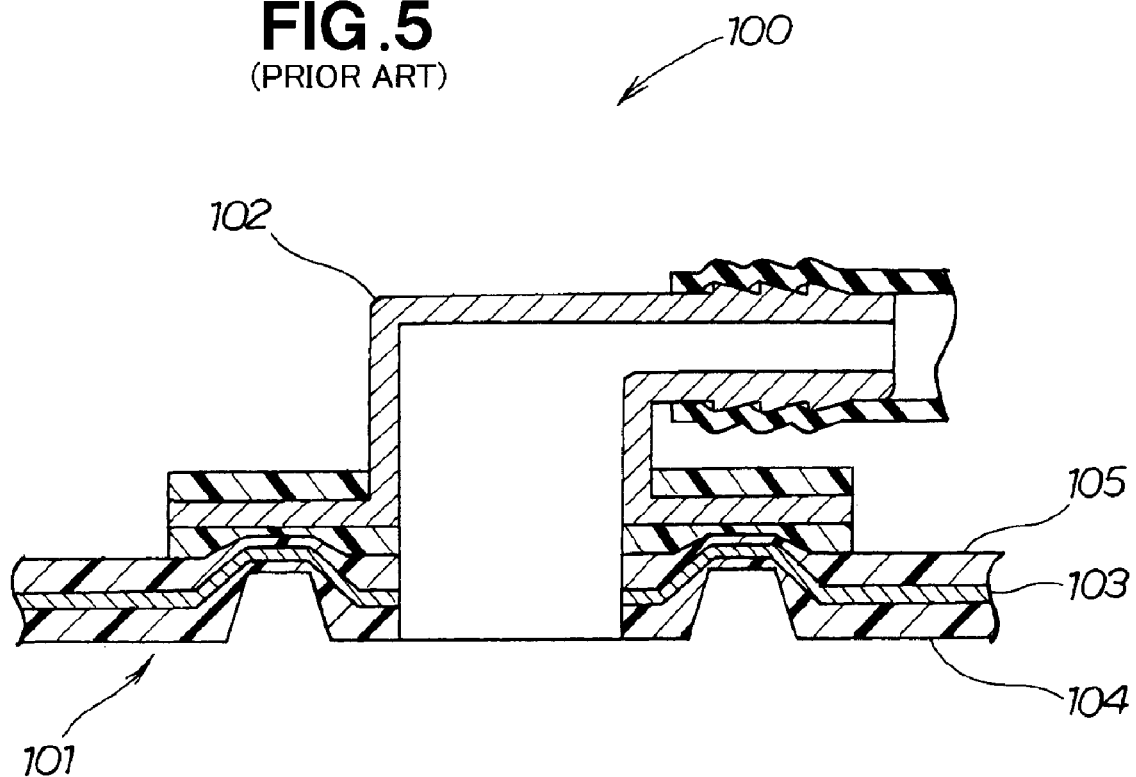
FIG. 5 is a partial cross-sectional view illustrating, on an enlarged scale, a conventional plastic fuel tank.

FIG. 4B shows the plastic fuel tank of the present embodiment. The outermost layer (exterior side) 35 of the plastic fuel tank 16 is colored black, and the innermost layer (interior side) 38 is colorless.

When the innermost layer 38 of the plastic fuel tank 16 is colorless, and the reddish-brown gasoline is superposed on a colorless base, the reddish-brown gasoline does not blend into the colorless base, and is therefore highly visible.

In addition, outside light that enters through the filler neck 18 penetrates the reddish-brown gasoline, reaches the bottom, and reflects from the colorless base. Therefore, when looking inside the plastic fuel tank 16, the interior is illuminated, a protrusion 41 where the small depression 23 protrudes into the interior side of the plastic fuel tank 16 can be seen, and a fluid level 42 of the fuel can be determined.

In addition, if the innermost layer 38 is transparent, outside light passes through the transparent layer and enters the interior of the plastic fuel tank 16. Specifically, the transparent layer plays the role of a light guide. As a result, outside light enters the interior of the plastic fuel tank 16, illuminating the interior of the plastic fuel tank 16. The gasoline is readily visible through the filler neck 18 as a result.

The polyethylene layers 34, 35 are laminated onto one side 32 of the ethylene/vinyl alcohol layer 31 for preventing fuel seepage, and the polyethylene layer 38 is laminated onto the other side 36 of the ethylene/vinyl alcohol layer 31 via the adhesive plastic layers 33, 37, respectively, as shown in FIGS. 1 to 3. In the plastic fuel tank 16 thus configured, the polyethylene layer 35 disposed as the outermost layer 35 of the plastic fuel tank 16 is formed from high-density polyethylene and is colored so as to minimize the transmission of ultraviolet light.

The polyethylene layer 35 as the outermost layer 35 minimizes the transmission of ultraviolet light, enabling degradation of the ethylene/vinyl alcohol layer 31 or the like to be prevented, and weather resistance to be improved. As a result, it is possible to provide a plastic fuel tank 16 that prevents fuel seepage and is weather resistant.

In addition, since the transmission of ultraviolet light into the plastic fuel tank 16 is minimized, it is possible to prevent the fuel from degrading. In particular, the fuel is colored differently by the transmission of ultraviolet light, depending on the type of gasoline used as the fuel, but the present invention can prevent color change in the fuel and can improve the appearance of the plastic fuel tank 16 on the inside.

The polyethylene layer provided as the innermost layer of the plastic fuel tank is white or colorless, as shown in FIGS. 1 to 4.

The polyethylene layer 38 provided as the innermost layer 38 of the plastic fuel tank 16 is white or colorless. Light penetrates through the filler neck 18 when the filler cap 21 is removed to look inside the plastic fuel tank 16 through the filler neck 18, but the white or colorless interior surface reflects the light, illuminating the interior of the tank 16 and hence allowing the fluid level 42 to be determined.

The high-density polyethylene layer 35 is black, as shown in FIG. 3. The transmission of ultraviolet light is therefore minimized, allowing the weather resistance of the plastic fuel tank 16 to be improved.

The high-density polyethylene layer 35 is colored by the admixing of carbon black powder, as shown in FIG. 3. The high-density polyethylene layer 35 can thus be produced in a simple manner merely by the admixture of carbon black powder.

At least one layer toward the interior from the outermost layer 35 is the colorless, recycled polyethylene layer 34, as shown in FIG. 3. Recycled polyethylene material is inexpensive, allowing the costs associated with the plastic fuel tank 16 to be reduced.

The recycled polyethylene material of the recycled polyethylene layer 34 may be a mixture of adhesive plastic and an ultraviolet inhibitor, and may be a recycled material having recycled polyethylene as the main component.

The section from the tank assembly 17 of the plastic fuel tank 16 to the opening 25 of the filler neck 18 is molded as an integrated unit, as shown in FIGS. 1, 2. Accordingly, there is no joint between the tank assembly 17 and the filler neck 18, eliminating concern that fuel will leak through the joint. In addition, there is no need to produce the components of the filler neck 18 separately, allowing the costs associated with the entire plastic fuel tank 16 to be reduced.

The tank assembly 17 is provided to the upper part of the general-purpose engine 10, as shown in FIG. 1. With the tank assembly 17 being located in the upper part of the general-purpose assembly 10, the plastic fuel tank 16 is viewed from above when the general-purpose engine 10 is placed on the ground. According to the present invention, the filler cap 21 in the upper part of the plastic fuel tank 16 is removed and the level 42 of the fuel inside the tank 16 is determined through the filler neck 18. The remaining fuel can therefore be readily determined even when the tank assembly 17 is located in the upper part of the general-purpose engine 10.

The plastic fuel tank 16 of the present invention was applied in this embodiment to a general-purpose engine, but the tank can also be applied to an electric generator, a cultivator, or other machines. The present invention may be applied to any typical machine that uses fuel or to the fuel tank itself.

The plastic fuel tank of the present invention is suitable for a plastic fuel tank in which a polyethylene layer is laminated via an adhesive plastic layer onto both sides of an ethylene/vinyl alcohol layer for preventing fuel seepage.

Obviously, various minor changes and modifications of the present invention are possible in light of the above teaching. It is therefore to be understood that within the scope of the appended claims the invention may be practiced otherwise than as specifically described.

What is claimed is:

1. A plastic fuel tank including a tank assembly and a filler neck, comprising:
   an ethylene/vinyl alcohol layer for preventing fuel seepage;
   an outermost polyethylene layer laminated onto one surface of the ethylene/vinyl alcohol layer;
   an innermost polyethylene layer laminated onto another surface of the ethylene/vinyl alcohol layer; and
   a colorless recycled polyethylene layer interposed between the ethylene/vinyl alcohol layer and the outermost polyethylene layer,
   wherein the outermost polyethylene layer is a high-density polyethylene layer colored so as to minimize transmission of ultraviolet light,
   wherein the tank assembly includes a small depression which protrudes towards the interior side of the fuel tank and engages with a portion of the filler neck, and
   wherein the small depression is formed such that a portion of the small depression is visible when looking inside the fuel tank through the filler neck.

2. The fuel tank of claim 1, wherein the innermost polyethylene layer is white or colorless.

3. The fuel tank of claim 1, wherein the high-density polyethylene layer is black.

4. The fuel tank of claim 1, wherein the high-density polyethylene layer is colored by admixing carbon black powder.

5. The fuel tank of claim 1, wherein the tank assembly is formed integrally with the filler neck.

6. The fuel tank of claim 1, wherein the tank assembly is provided to an upper part of a general-purpose engine.

* * * * *